United States Patent
Langlet

(10) Patent No.: US 8,052,923 B2
(45) Date of Patent: Nov. 8, 2011

(54) METHOD OF PRODUCING PRODUCTS OF AMORPHOUS METAL

(76) Inventor: Abraham Langlet, Stockholm (SE)

( * ) Notice: Subject to any disclaimer, the term of this patent is extended or adjusted under 35 U.S.C. 154(b) by 408 days.

(21) Appl. No.: 12/311,310

(22) PCT Filed: Sep. 26, 2007

(86) PCT No.: PCT/SE2007/000844
§ 371 (c)(1),
(2), (4) Date: Mar. 26, 2009

(87) PCT Pub. No.: WO2008/039134
PCT Pub. Date: Apr. 3, 2008

(65) Prior Publication Data
US 2009/0277540 A1 Nov. 12, 2009

(30) Foreign Application Priority Data
Sep. 26, 2006 (SE) .................... 0602001

(51) Int. Cl.
*B22F 3/105* (2006.01)
*C22C 45/00* (2006.01)

(52) U.S. Cl. ............. 419/7; 148/513; 148/561; 419/5; 419/6; 419/23; 419/25; 427/556

(58) Field of Classification Search .......... 148/403, 148/513, 561; 219/76.1–76.17, 121.11–121.86; 419/5–7, 23, 25, 61; 427/398.1–398.5, 532, 427/553–556, 597
See application file for complete search history.

(56) References Cited

U.S. PATENT DOCUMENTS

| | | | |
|---|---|---|---|
| 4,323,756 A | 4/1982 | Brown et al. | |
| 4,863,538 A | 9/1989 | Deckard | |
| 4,892,579 A | 1/1990 | Hazelton | |
| 5,837,960 A | 11/1998 | Lewis et al. | |
| 2002/0041818 A1* | 4/2002 | Abe et al. | 419/7 |
| 2006/0157454 A1* | 7/2006 | Larsson | 219/121.8 |
| 2006/0165546 A1* | 7/2006 | Yamada et al. | 419/6 |

FOREIGN PATENT DOCUMENTS

WO  WO 2004/056509 A1  7/2004

OTHER PUBLICATIONS

Inoue et al. "Stability and Icosahedral Transformation of Supercooled Liquid in Metal-Metal type Bulk Glassy Alloys." Mat. Res. Soc. Symp. Proc. vol. 805. 2004. pp. 183-201.*

* cited by examiner

*Primary Examiner* — Stanley Silverman
*Assistant Examiner* — Brian Walck
(74) *Attorney, Agent, or Firm* — Jacobson Holman PLLC

(57) ABSTRACT

A method of producing three-dimensional bodies which wholly or for selected parts consist of amorphous metal. A metal powder layer (4) is applied to a heat-conducting base (1, 13), and a limited area of the layer is melted by a radiation gun (5) and the area is cooled so that the melted area solidifies into amorphous metal. The melting process is successively repeated on new limited areas of the powder layer until a continuous layer of amorphous metal is formed. A new powder layer is applied and the method is repeated, the new layer being fused to underlying amorphous metal for successive construction of the three-dimensional body. The heat-conducting base can be a worktable or a body of amorphous metal or crystalline metal to which amorphous metal is added.

11 Claims, 2 Drawing Sheets

METHOD OF PRODUCING PRODUCTS OF AMORPHOUS METAL

This is a national stage of PCT/SE2007/000844 filed Sep. 26, 2007 and published in English, which has a priority of Sweden no. 0602001-0 filed Sep. 26, 2006, hereby incorporated by reference.

BACKGROUND OF THE INVENTION

1. Field of the Invention

The invention relates to a method of producing three-dimensional bodies which wholly or for selected parts consist of amorphous metal.

2. Description of the Related Art

When cooling a metallic material from melt to solid phase, a polycrystalline structure is usually provided. Here the microstructure consists of a large number of different grains, the atoms in each grain being arranged according to some kind of regular pattern. The number of grains and the size of the grains can be affected, for example by using different cooling speeds from melt or by different types of mechanical working and heat treatment of the solid material. If the entire material consists of one crystal, a single crystal material is obtained, in which all atoms are positioned in a mutually ordered manner. If the atoms are instead completely disordered and there are no grains with regularly positioned atoms, the material is said to be amorphous. This can be achieved, for example, by cooling a melt very rapidly so that there is no time for grains to grow, or by very extensive mechanical deformation where the grains are disrupted. Generally seen materials with amorphous structure are common. For example, many polymer materials are wholly or partly amorphous in solid phase since the relatively complex molecule makes crystallisation to repeatable units difficult. There are also many metal oxides which easily form an amorphous structure. At the beginning of the sixties, the first amorphous metals were produced by a thin layer of melt being sprayed on a heat-conducting base. This resulted in very high cooling speeds of $10^5$-$10^6$ K/s and there was no time for grains to grow, but the disordered structure was maintained also in the solid phase. The resulting alloys, however, were very thin with a thickness of just some tenths of a micrometer and therefore had limited ranges of application.

Amorphous bulk metals or amorphous structural metals, that is amorphous metals with dimensions that permitted structural applications, were not produced until the seventies from specially composed alloys. Bulk metals of these alloys were produced by cooling from melt at a cooling speed of about 1000 K/s but contained, inter alia, the expensive metal palladium, which prevented large volumes of production. At the end of the eighties Professor Inoue at the Tohoku University in Japan managed to develop various multicomponent systems consisting of common metallic elements which resulted in an amorphous bulk structure when cooling from melt. In the years that followed a great number of different amorphous metal systems have been found.

Table 1 below exemplifies some amorphous metal systems and the maximum thickness in which they can presently be cast and the critical cooling speed for an amorphous bulk structure to be formed.

| Alloy system | Maximum thickness mm | Critical cooling speed K/s |
|---|---|---|
| Lantanide-Al—(Cu,Ni) | 10 | 200 |
| Mg-Lantanide-(Cu,Ni) | 10 | 200 |
| Zr—Al—(Cu,Ni) | 30 | 1-10 |
| Zr—Ti—Al—(Cu,Ni) | 30 | 1-5 |
| Zr—Ti—(Cu,Ni)—Be | 30 | 1-5 |
| Fe—(Al,Ga)—(P,C,B,Si,) | 3 | 400 |
| Pd—Cu—Ni—P | 75 | 0.1 |
| Fe—(Co,Ni)—(Zr,Hf,Nb)—B | 6 | 200 |

The greatest problem in casting of three-dimensional bodies (bulk metal) of amorphous metal is to achieve a sufficient cooling speed. An insufficient cooling speed results in a crystalline material instead of an amorphous material. The cooling speed restricts the size and thickness of material to be produced. The required cooling speed also makes it difficult to cast complicated geometries, thus making it necessary to produce several different components to be assembled. In practice, there will only be a limited choice of materials since there is a limited number of alloy systems that have a critical cooling speed that is practicably handleable in casting of construction components.

BRIEF SUMMARY OF THE INVENTION

The object of the present invention is to provide a method of producing three-dimensional bodies of amorphous metal where the above-mentioned problems are significantly reduced. A further object is to provide a method that allows production of three-dimensional bodies of which selected parts consist of amorphous metal.

This is achieved by a method as defined in the appended claims.

According to the invention, a layer of metal powder is applied to a heat-conducting base and a limited area of the layer is melted by a radiation gun and the area is cooled so that the melted area solidifies into amorphous metal. The melting process is successively repeated on new limited areas on the powder layer until a continuous layer of amorphous metal is formed. A new powder layer is then applied and the method is repeated, the new layer being fused to underlying amorphous metal for successive construction of the three-dimensional body.

The radiation gun is controlled so that the contours of the continuous layer of amorphous metal that is formed correspond to a cross-section through the three-dimensional body. The body is built up layer by layer according to stacked cross-sections.

Instead of casting and melting all the material at the same time, small limited areas of the powder layer are melted at a time, after which the radiation gun is moved to another area of the powder layer. The melted area is cooled immediately. A small volume of melted alloy is easy to cool and the critical cooling speed for the melted volume to solidify into amorphous metal can be achieved. The size of the limited area and the thickness of the powder layer may vary depending on the critical cooling speed of the alloy in question. The limited area can typically have a size from 1 $mm^2$ to 200 $mm^2$ and the powder layer can have a thickness from 0.1 mm to 5 mm.

The principle of building up a body layer by layer by melting of successively applied powder layers using a radiation gun is known and referred to as freeforming technology. U.S. Pat. No. 4,863,538 and WO 2004/056509 disclose this technology. In particular plastic powders have been melted and ceramic powders been sintered together in this manner, but recently also metal objects have been prepared by melting metal powder by freeforming technology. WO 2004/056509 discloses a method of avoiding stresses in the material when melting metal powder by the radiation gun not sweeping over the powder layer in regular lines from one side to the other but first melting selected areas of the powder layer according to an operating scheme and then connecting these areas. A technology similar to the one in WO 2004/056509 is particularly suited for use in the present invention, where limited areas, for instance punctiform areas, are melted in a scattered pattern to make it easier to rapidly cool the melted area and deflect the heat through the worktable before it is time to melt a neighbouring limited area.

The heat-conducting base may consist of a worktable but may also be a body of amorphous or crystalline metal which is part of the completed three-dimensional body and to which amorphous metal is added according to the method.

The cooling of the melted limited area can take place by the heat-conducting base, for instance a worktable, consisting of a material with high thermal conductivity and having a sufficient mass to serve as an effective heat sink which quickly absorbs the heat from the melted areas. The worktable may consist of, for instance, a thick sheet of heat-conducting metal, such as copper, aluminium or iron, or a cermet with high thermal conductivity, such as boron nitride.

Preferably the heat-conducting base is cooled by a refrigerant, such as water. For example, the worktable can be provided with cooling ducts through which the refrigerant is passed so that the heat absorbed in the heat sink/worktable is continuously deflected.

When an amorphous or crystalline body is provided with an amorphous part, the body can be surrounded by cooling coils and embedded in a powder with high thermal conductivity.

The metal powder distributed on the working area can be an amorphous powder or a crystalline powder of an alloy that forms amorphous metal in rapid cooling. Examples of such alloys are:

Ni—Nb—Sn
Co—Fe—Ta—B
Ca—Mg—Ag—Cu
Co—Fe—B—Si—Nb
Fe—Ga—(Cr,Mo)—(P,C,B)
Ti—Ni—Cu—Sn
Fe—Co-Ln-B
Co—(Al,Ga)—(P,B,Si)
Fe—B—Si—Nb
Ni—(Nb,Ta)—Zr—Ti
Ni—Zr—Ti—Sn—Si
Fe—Ga—(P, B)
Co—Ta—B
Ni—(Nb,Cr,Mo)—(P, B)
Fe—(Al,Ga)—(P,C,B,Si,Ge)
Zr—Ti—Cu—Ni—Al
Zr—(Ti,Nb,Pd)—Al-TM
Zr—Ti-TM-Be
Ti—Zr-TM
Zr—Al-TM
Mg-Ln-M
TM=transition metal
M=metal Further alloys of this type are stated in Inoue et alia: "Stability and Icosahedral Transformation of Supercooled Liquid in Metal-Metal type Bulk Glassy Alloys" presented at the Material Research Society, Boston, Mass., USA.

Preferably the metal powder is a second generation amorphous alloy which is also usually referred to as Inoue alloy.

The radiation gun can be a high power laser, such as a YAG laser, or electron beam.

BRIEF DESCRIPTION OF THE DRAWINGS

An embodiment of the invention will in the following be described in more detail with reference to the accompanying figures. Equivalent components in the two figures have been given the same reference numerals.

DETAILED DESCRIPTION OF THE PREFERRED EMBODIMENTS

Figure 1:
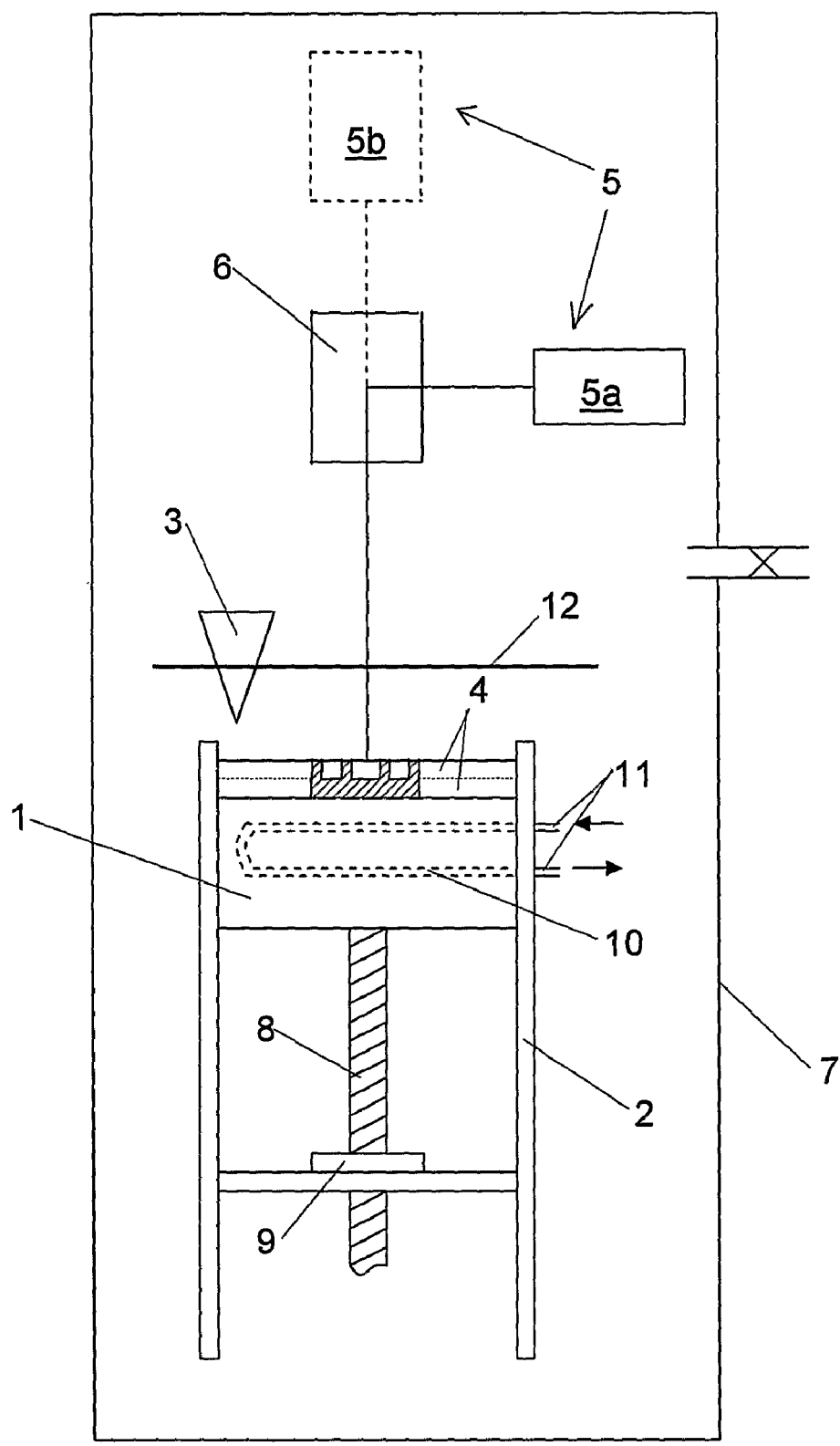
FIG. 1 is a schematic cross-section of an arrangement that can be used for production of products of amorphous metal according to the inventive method.

FIG. 1 illustrates an arrangement comprising a worktable 1, which is vertically adjustable and arranged in a case or a framework 2. The vertical adjustment of the worktable 1 can take place in various ways and comprises in the shown embodiment a screw 8 and a nut 9. A powder dispenser 3 is movable back and forth across the worktable for applying powder layers 4. A radiation gun 5 in the form of a laser 5a or an electron beam 5b and associated control means 6 for directing the laser beam/electron beam to selected positions on the powder layer. A control computer (not shown) regulates the worktable, the powder dispenser, the radiation gun and its control means. The control computer also contains information on the shape of the three-dimensional body to be produced (3-D drawing) and, thus, the contours of the cross-section represented by each powder layer. The entire arrangement or parts thereof are enclosed in a casing 7 so that an inert atmosphere, or vacuum in electron beam melting, can be maintained during the melting process.

The worktable 1 may consist of, for instance, a thick sheet of a material with high thermal conductivity as mentioned above. Cooling ducts 10 are arranged in the worktable so that it can be passed by a refrigerant. Connections 11 are arranged to supply and discharge the refrigerant. The refrigerant can be water for instance.

In the shown embodiment, the powder dispenser 3 is a funnel-shaped container which is slidable on guides 12 across the worktable. Powder is dispensed from the lower edge of the container while passing over the worktable and a scraper or some other leveling device (not shown) distributes the powder evenly over the working area.

The radiation gun 5 may consist of a high power laser 5a, for instance a YAG laser, and the control means 6 may consist of mirrors in the same way as shown in U.S. Pat. No. 4,863,538. The radiation gun 5 may also consist of an electron beam 5b in the same way as shown in WO 2004/056509, the control means 6 consisting of deflecting coils.

The casing 7 is used to enclose the parts of the arrangement that are subjected to vacuum when fusing with an electron beam, or the parts of the arrangement that are subjected to inert gas atmosphere, such as argon, in laser melting.

The method according to the invention will in the following be exemplified while using an arrangement as stated above. The method is exemplified while using a laser, but an electron beam can be used correspondingly.

A thin powder layer 4 is spread on the worktable 1 by means of the powder dispenser 3. The control computer directs, by the control means 6, the laser to a selected limited area (point) on the layer that is to be melted. A laser pulse is activated and melts the limited area. Preferably the entire thickness of the powder layer is melted on the limited area so as to be fused to the worktable 1. Thus the heat transfer to the cooled worktable will be optimal. The melted area quickly solidifies into amorphous metal as the laser pulse ceases. The control computer then directs the laser to another limited area, which preferably is as far away from the first melted area as possible, and the melting process is repeated. This process is repeated until the limited areas are melted to form a continuous layer. Subsequently the worktable 1 is lowered, a new thin powder layer 4 is applied by the powder dispenser 3 and new limited areas are melted with laser pulses, whereby the area is fused to the underlying amorphous layer. In this way, the three-dimensional body is built up layer by layer, each layer being melted according to the contours that correspond to the cross-section of the three-dimensional body. With the body fused to the worktable, the body must be cut loose when completed. The first layers produced therefore are excess material and need not be an actual cross-section of the completed body but can be formed more freely to ensure good heat transfer to the worktable.

In the normal case, refrigerant is passed through the cooling ducts 10 in the worktable and continuously removes the heat that is absorbed in the heat sink. When producing small and thin products, the function of the worktable as a heat sink can be sufficient to rapidly cool the melt into amorphous metal without the table being passed by a refrigerant.

Figure 2:
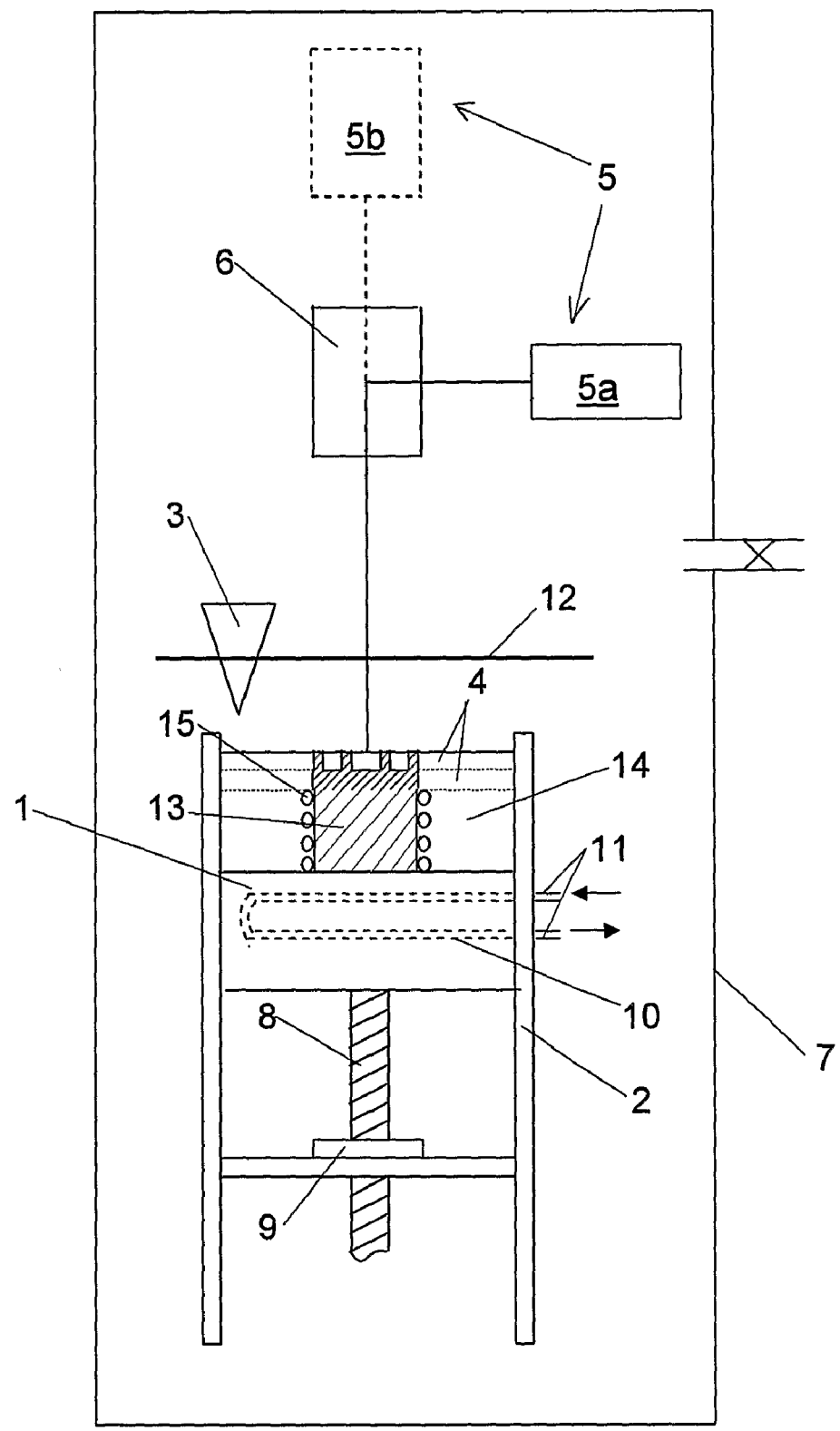
FIG. 2 is a schematic cross-section of an arrangement for adding amorphous metal to a body according to the inventive method.

FIG. 2 illustrates schematically how amorphous metal can be added to a body 13 of amorphous or crystalline metal. The body 13 is placed on the worktable 1 and embedded in a powder 14 with high thermal conductivity. In addition the body is surrounded by cooling coils 15 that are passed by a refrigerant. Both the worktable 1 and the body 13 can thus be cooled by a refrigerant. The procedure is substantially the same as described above. A metal powder layer 4 is applied to the body 13 and the layer is successively fused to the body, area by area, during cooling. In this case also the first layer corresponds to a cross-section of the completed body.

Example 1

A thin layer of an alloy $Zr_{52.5}Ti_5Cu_{7.9}Ni_{14.6}Al_{10}$ was applied to a water-cooled sheet of boron nitride in an atmosphere of argon. A YAG laser with a wavelength of 1063 nm was used to melt the material. The beam was focused and had a diameter of 0.2 mm. The alloy was heated until it melted. A 3 mm wide and 15 mm long strip was produced. Half the surface of the strip was then coated with a new thin powder layer and the process was repeated so that the powder layer fused to the underlying layer. After the experiment, DSC (Differential Scanning Calorimetry) was used to establish that the material was amorphous.

The invention claimed is:

1. A method of producing three-dimensional bodies which wholly or for selected parts consist of amorphous metal, characterised in that a metal powder layer (4) is applied to a heat-conducting base (1, 13), that a limited area of the layer is melted by a radiation gun (5) and that the area is cooled so that the melted area solidifies into amorphous metal, that the melting process is successively repeated on new limited areas of the powder layer until a continuous layer of amorphous metal is formed, and that a new powder layer (4) is applied and that the method is repeated, the new layer being fused to underlying amorphous metal for successive construction of the three-dimensional body.

2. A method as claimed in claim 1, characterised in that the continuous layer of amorphous metal corresponds to a cross-section of the three-dimensional body.

3. A method as claimed in claim 1, characterised in that the first powder layer (4) is fused to the heat-conducting base (1, 13).

4. A method as claimed in claim 1, characterised in that the heat-conducting base is a body (13) of amorphous metal or crystalline metal which is part of the completed three-dimensional body and to which part amorphous metal is added.

5. A method as claimed in claim 1, characterised in that the heat-conducting base is a worktable (1).

6. A method as claimed in claim 1, characterised in that the heat-conducting base (1, 13) consists of a material with high thermal conductivity and serves as a heat sink for rapid cooling of the melted area in the powder layer.

7. A method as claimed in claim 1, characterised in that the heat-conducting base (1, 13) is cooled by a refrigerant.

8. A method as claimed in claim 7, characterised in that the refrigerant is passed through cooling ducts (10) in the heat-conducting base.

9. A method as claimed in claim 7, characterised in that the refrigerant is passed through cooling coils (15) surrounding the heat-conducting base.

10. A method as claimed in claim 1, characterised in that the metal powder consists of a second generation amorphous alloy, referred to as Inoue alloy.

11. A method as claimed in claim 1, characterised in that the metal powder consists of an alloy selected from the group consisting of Ni—Nb—Sn
Co—Fe—Ta—B
Ca—Mg—Ag—Cu
Co—Fe—B—Si—Nb
Fe—Ga—(Cr,Mo)—(P,C,B)
Ti—Ni—Cu—Sn
Fe—Co-Ln-B
Co—(Al,Ga)—(P,B,Si)
Fe—B—Si—Nb
Ni—(Nb,Ta)—Zr—Ti
Ni—Zr—Ti—Sn—Si
Fe—Ga—(P,B)
Co—Ta—B
Ni—(Nb,Cr,Mo)—(P,B)
Fe—(Al,Ga)—(P,C,B,Si,Ge)
Zr—Ti—Cu—Ni—Al
Zr—(Ti,Nb,Pd)—Al-TM
Zr—Ti-TM-Be
Ti—Zr-TM
Zr—Al-TM
Mg-Ln-M
wherein TM=transition metal and M=metal.

* * * * *